Nov. 7, 1933.  H. C. THEW  1,934,019
WATCH CLEANING MACHINE
Filed Sept. 12, 1932  2 Sheets-Sheet 1

Inventor
Harry C. Thew
By: Zabel & Banning
Attys.

Nov. 7, 1933.   H. C. THEW   1,934,019
WATCH CLEANING MACHINE
Filed Sept. 12, 1932   2 Sheets-Sheet 2

Inventor
Harry C. Thew
By:

Patented Nov. 7, 1933

1,934,019

UNITED STATES PATENT OFFICE 1,934,019

WATCH CLEANING MACHINE

Harry C. Thew, Lima, Ohio

Application September 12, 1932
Serial No. 632,666

1 Claim. (Cl. 141—1)

My invention relates to machinery for cleaning watches and the like and has as its object the provision of a machine which will enable one to clean watches and parts and similar devices with a minimum amount of handling and loss of time.

More specifically, it is a purpose of my invention to provide a machine of this character wherein the parts to be cleaned are rotated in a foraminous receptacle which receptacle is immersed in a liquid cleaner, the receptacle and the container for the liquid being so shaped as to insure direct flow of the liquid through the receptacle and thus a thorough cleaning of the parts.

It is a further object of my invention to provide a machine of this character wherein the parts placed in the receptacle for cleaning may be treated with a plurality of liquids and dried without having to handle them and thus subject them to danger of breakage.

I will describe the preferred form of my invention by reference to the accompanying drawings wherein—

Figure 1:
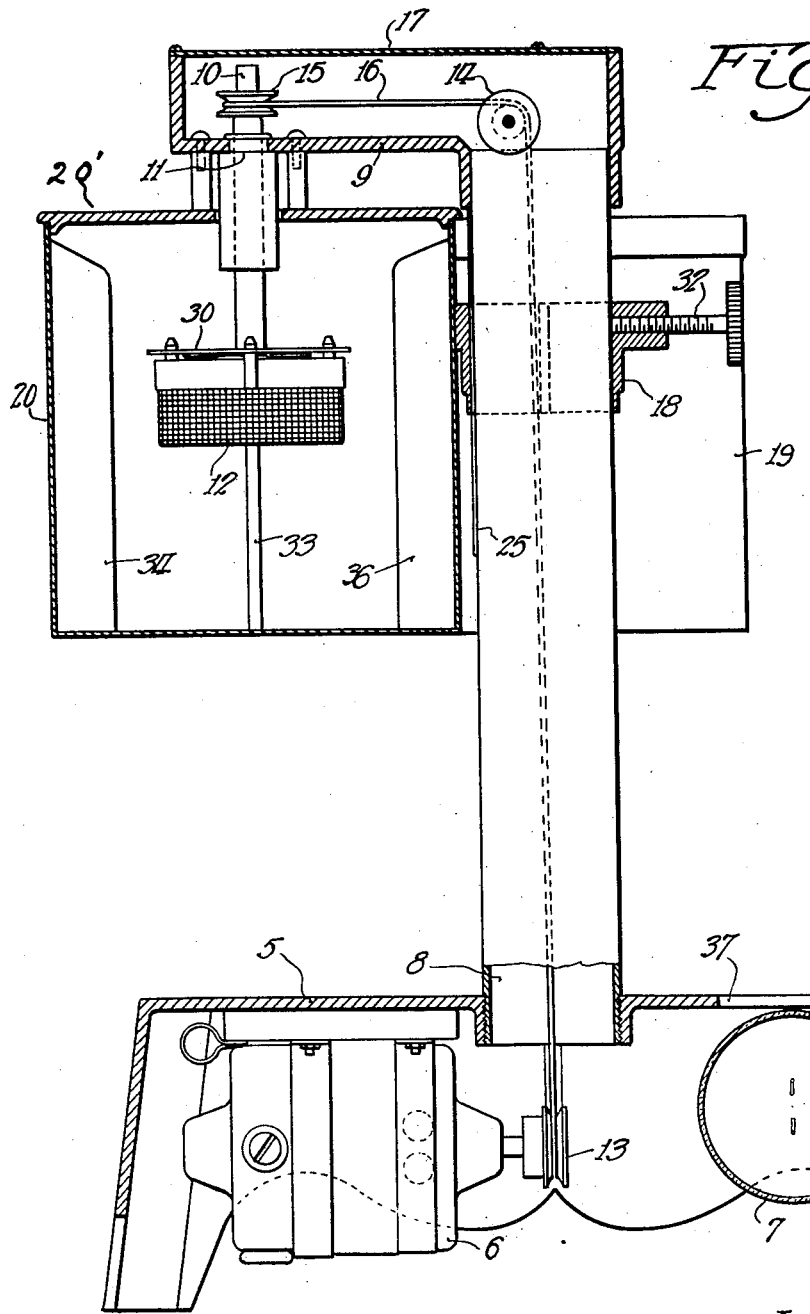
Fig. 1 is a vertical section through the machine showing the receptacle in position for cleaning.

Referring now in detail to the drawings, the machine is supported on the base 5 which base carries a driving motor 6 and a drying lamp 7. Mounted in the base and projecting upwardly therefrom is the hollow standard 8. This hollow standard has at the top the laterally projecting hollow arm portion 9 forming a support for the shaft 10 which is supported in a suitable bearing member 11 and which carries at its lower end the receptacle 12.

The means for rotating the receptacle 12, as shown, consists of the drive pulley 13 on the motor shaft, the guide pulleys 14 mounted at the top of the standard 8, and pulley 15 mounted on the shaft 10. A suitable belt 16 serves as the connecting means between pulleys 13 and 15. A suitable cover 17 closes the top of the hollow arm 9 and thus encloses the operating mechanism for driving shaft 10.

Mounted for vertical sliding movement on the standard 8 there is a supporting frame or bracket 18. This bracket carries three receptacles 19, 20, and 21 which receptacles are spaced 90° apart about the center of the standard 8 as an axis. These receptacles are, as shown, substantially square in horizontal cross section and are used to contain the cleaning liquid in which the parts contained in the receptacle 12 are to be washed. The bracket 18 has a number of key slots as indicated at 22, 23, and 24 which key slots are adapted to cooperate with key 25 on the standard 8 so as to properly center the receptacles with respect to shaft 10 and receptacle 12 when it is desired to raise any container up around receptacle 12. Key 25 is extended down sufficiently low that it is necessary to drop the bracket 18 low enough that the tops of the containers clear the bottom of the receptacle 12 before they can be rotated around the standard 8 to bring a new container in line with the receptacle 12. Receptacle 12 is preferably square in cross section, as shown in dotted lines in Fig. 2, and consists of the bottom portion 26, the reenforcing rim 27, and the supporting rim 28. This supporting rim 28 carries a plurality of upstanding headed pins 29 which are adapted to slip through keyhole slots in the supporting plate 30 and by a slight turn of the receptacle relative to the supporting plate 30 to lock the receptacle onto the plate.

In order to prevent the receptacle working loose during the rotation thereof, I provide the spring 31 which spring is engaged by the receptacle top 28 in forcing the pins 29 up through the slots in plate 30 and thus compressed so as to oppose any movement of the receptacle relative to the plate 30 while the washing movement is taking place. The set screw 32 is utilized to lock the bracket 18 in raised position during the washing action.

Figure 2:
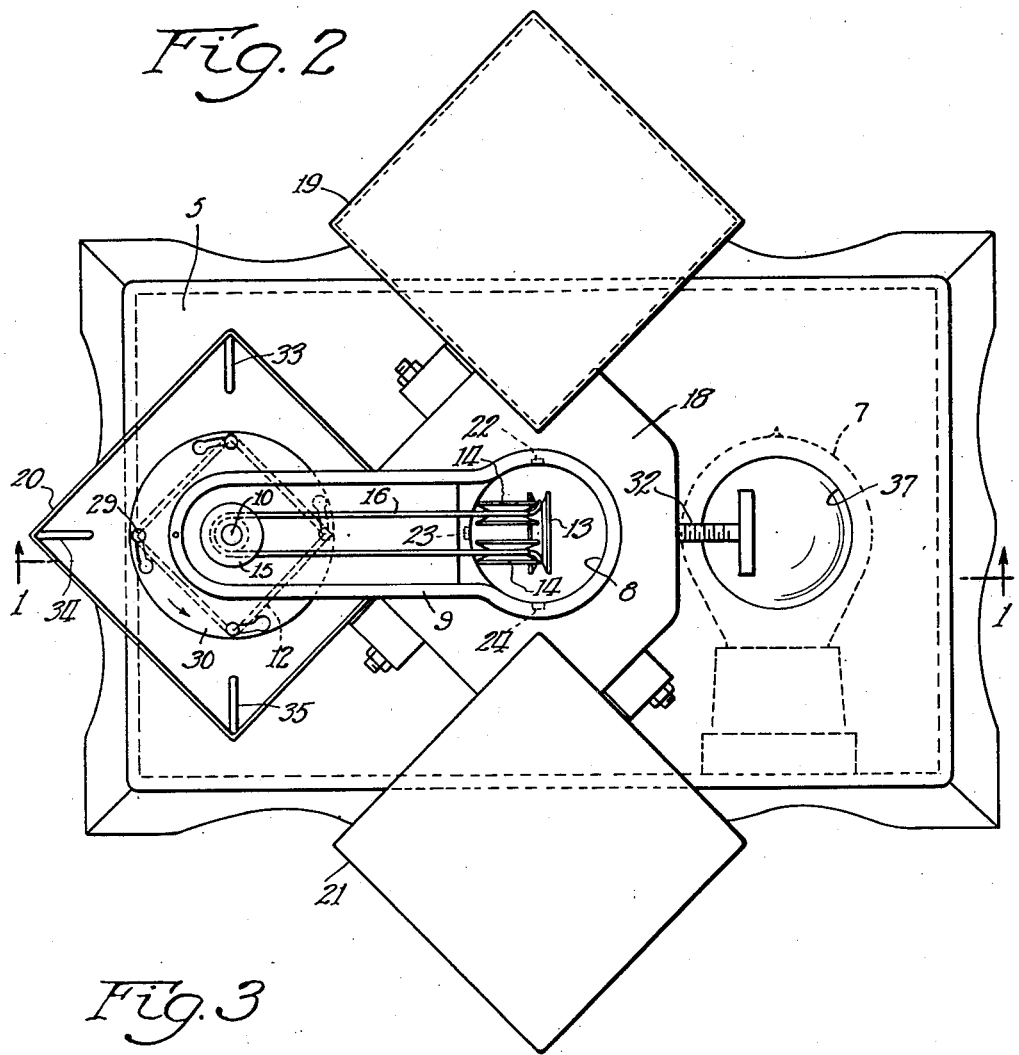
Fig. 2 is a plan view.
Figure 3:
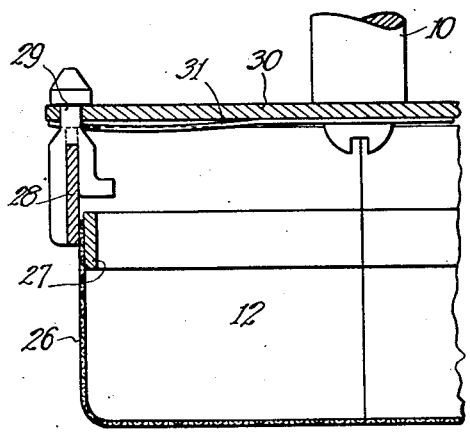
Fig. 3 is an enlarged detail sectional view of the receptacle.

In conjunction with the rectangular containers and the receptacle, I also employ substantially at the corners of the side walls of the containers a plurality of baffles such as indicated at 33, 34, 35, and 36. These baffles may however be on the side walls but the corner baffle is preferred. The purpose of this structure is to cooperate with the rectangular side walls of the container and those of the receptacle so as to prevent the tendency of the liquid in the container to follow the receptacle in its rotation. The action of the receptacle in rotating, for example in the direction of the arrow as shown in Fig. 2, is to cooperate with the baffles and the rectangular side walls between the baffles on the container to force the liquid through the side walls of the receptacle 12 without giving the liquid any chance to start a whirling motion within the container that would more or less nullify the speed of rotation of the receptacle. Furthermore, this whirling of the liquid, if not checked, would cause the liquid to climb the side walls of the containers and spill over. Therefore, with the rectangular container, the rectangular receptacle, and the baffles, I have a structure which enables me to rotate the receptacle at a relatively high speed and very rapidly to force the liquid through the parts to be cleaned to accomplish a thorough cleaning.

After a receptacle full of parts has been cleaned in one container, it is not necessary to disturb them or the receptacle to transfer them to another container. The container supporting bracket 18 is merely lowered so as to clear the lower end of the key 25 and then rotated to bring another container in line with the receptacle 12 when the bracket can again be raised and locked in raised position by means of the set screw 32. In this fashion, the parts may be thoroughly cleaned without the necessity of disturbing the receptacle during the cleaning operation.

After the cleaning operation is over, if desired, the receptacle and its contents may be placed over the opening 37 in the base and dried by means of the lamp 7.

In order to cover the containers 19, 20, and 21 when they are in operative position, I provide the depending cover 20' on the arm 9 supporting the drive shaft. Thus when the basket 12 is inserted in a container such as 19, the movement inserting the basket also places a cover over the fluid container.

I prefer to provide in connection with the motor 6 a suitable speed control rheostat so that the motor speed may be properly adjusted in accordance with the requirements of the parts which are to be cleaned. Some parts may need to be subjected to a much greater force of washing than others, and, by controlling the speed of the motor, I can accomplish this result.

From the above description, it is believed that the construction and advantages of this device will be clear to those skilled in this art.

Having thus described my invention, what I claim as new and desire to secure by Letters Patent is:

A cleaning liquid container for watch and jewelry cleaning machines, said container having substantially flat sides and baffle plates located substantially at the junctions of said sides and extending inwardly therefrom.

HARRY C. THEW.